Patented Dec. 24, 1940

2,225,794

UNITED STATES PATENT OFFICE 2,225,794

METHOD OF MANUFACTURING CURVED CONSTRUCTIONAL METAL MEMBERS

Keisaburo Ota, Kamata-Ku, Tokyo, Japan

No Drawing. Application September 3, 1937, Serial No. 162,337. In Japan June 3, 1935

4 Claims. (Cl. 204—6)

The present invention relates to a method of electrolytically manufacturing an irregularly curved iron sheet article, particularly a constructional part of an automobile body, which consists in electrolytically depositing a pure iron layer of desired thickness upon the surface of the cathode comprising a matrix made of metal and having a profile corresponding in shape and curvature with the constructional part to be manufactured; separating the electrolytically-deposited metallic layer from the matrix without producing any crack by delivering said matrix to a heating furnace as the metallic layer is electrolytically deposited thereon, so as to heat it quickly and uniformly above 500° C. and thus driving out the occluded gas; and then subjecting such metallic layer separated from the matrix to annealing treatment by heating it below 900° C. for several hours and thus causing the crystalline structure of the electrolytically-deposited metallic layer to appear suitably and giving to the layer the strength and stiffness essential to an automobile body. The object thereof is to manufacture at a very small cost the constructional parts of an automobile body having a complicated curved shape, especially a roof, back, corner portions, wheel covers and fenders and thus save the big cost required by using the known pressing machine, etc. Hitherto, the panels of an automobile body have been usually made by pressing and shaping an iron plate with a powerful press, so that it costs a big expense and also requires a big pressing machine to produce them in a large amount. Further, if the hammering process is used, the work is not only very difficult and needs particular technical skill, but also the panels of the body having a complicated shape, which have been worked by pressing, receive internal strain during the work and consequently always have the tendency of becoming deformed. As a stream line type body has lately been proposed, the body is designed to have the more complicated curved shape, especially with fenders having big curves and therefore the work is rendered more difficult.

According to this invention, it is possible to produce easily in a large amount even the panels of an automobile body having any complicated curved shape without mechanical pressing or hammering. The following is an explanation of an example of the manner of performing this invention:

For example, to manufacture the part corresponding to the roof of an automobile, firstly make a metallic matrix of a desired shape and form a separating surface by soldering a soft fusible alloy such as a soft solder to it. Next, dipping said matrix into iron electrolyte, make it perform electrolytic action as one of the electrodes, and an electrolytically-deposited pure iron layer of a desired shape corresponding to the form of the matrix will be formed. Thus, by performing the electrolytic action for a suitable time an electrolytically-deposited layer of any desired thickness may be obtained, and by the regulation of the time and current density is formed an electrolytically-deposited layer with the thickness several millimeters such as is suitable as the parts like the iron sheet for the panels of an automobile body, a wheel cover and fender. Then, the matrix together with the deposited iron layer is quickly and bodily introduced into a furnace maintained at temperature above 500° C. so as to quickly and uniformly heat said deposited iron layer and matrix, whereby automatically separating the deposited iron layer from the matrix without producing any crack or break. This is one of the most important features of this invention.

As is well known, electrolytic iron contains a comparatively large amount of hydrogen, and is brittle and has a tendency to break down or to get cracks when we attempt to separate the deposit from the matrix. For the purpose of preventing the production of such cracks or break-downs, it has sometimes been proposed to heat the deposited iron layer before it is subjected to the separating process. The heating for this purpose is usually carried out by raising the temperature gradually. When, however, the matrix with electrolytic iron deposited on it is subjected to such a heating process, the deposited iron obtains cracks or breaks down almost invariably when the temperature reaches about between 200° and 300° C. According to the present invention, the matrix with the electrolytic iron deposited on it is quickly and bodily introduced into a furnace whose temperature is maintained above 500° C. This process not only prevents cracks and break-downs of the deposited layer, but also results in the separation of the deposit from the matrix automatically.

If the thus-obtained electrolytically-deposited layer is left to cool after heated for several hours below 900° C., namely, the temperature not exceeding the transformation point of iron, pure iron will have its structure changed to have suitable strength and necessary stiffness. In this way, it is possible to complete the desired panels of an automobile body.

What are called the panels of an automobile body in this invention include the panels of iron sheet of the body, a wheel cover and fender.

Although the process herein described is explained with regard to the manufacture of the panels of an automobile, it is to be understood that the invention can be applied to the manufacture of curved iron sheets which are to be use in fields other than in the automobile industry.

According to the above process unlike the known mechanical pressing process where a metal sheet is formed forcibly into a desired shape or the known work by hammering, there is no strain latent in the material and the metallic layer may be deposited by electrolytic depositing process to correspond to a desired complicated curve from the beginning, so no unreasonable internal stress is latent in the material, and since a crystalline structure is made to appear to some extent by low temperature annealing, the product gets suitable strength and stiffness. It therefore is not only very simple to manufacture, but may have appear easily the complicated shape and even minute parts considered quite impossible by the known pressing method. Moreover, without the necessity of polishing, it is possible to produce the panels of the body having lustrous smooth surfaces.

I claim:

1. A method of manufacturing a curved constructional metal member, which consists in electrolytically depositing a pure iron layer of a desired thickness upon the surface of a cathode comprising a metallic matrix having a curved profile corresponding in shape and curvature with the constructional member to be manufactured, then quickly and bodily introducing said matrix together with the iron layer deposited thereon into a heating furnace maintained at a temperature above 500° C. so as to quickly and uniformly heat said deposited iron and matrix, thereby automatically separating the deposited iron layer from the matrix without producing any crack or break.

2. A method of manufacturing a curved constructional metal member, which consists in electrolytically depositing a pure iron layer of a desired thickness upon the surface of a cathode comprising a metallic matrix having a curved profile correspondinng in shape and curvature with the constructional member to be manufactured and having its surface coated with an alloy of lower melting point, then quickly and bodily introducing said matrix together with the iron layer deposited thereon into a heating furnace maintained at a temperature above 500° C. so as to quickly and uniformly heat said deposited iron and matrix, thereby automatically separating the deposited iron layer from the matrix without producing any crack or break.

3. A method of manufacturing curved iron articles, which consists in electrolitically depositing a pure iron layer of a desired thickness upon the surface of a cathode comprising a metallic matrix having a curved profile corresponding in shape and curvature with the article to be manufactured, then quickly and bodily introducing said matrix together with the iron layer deposited thereon into a heating furnace maintained at a temperature above 500° C. so as to quickly and uniformly heat said deposited iron and matrix, thereby automatically saparating the deposited iron layer from the matrix without producing any crack or break.

4. A method of manufacturing curved iron articles, which consists in electrolytically depositing a pure iron layer of a desired thickness upon the surface of a cathode comprising a metallic matrix having a curved profile corresponding in shape and curvature with the article to be manufactured, and having its surface coated with an alloy of lower melting point, then quickly and bodily introducing said matrix together with the iron layer deposited thereon into a heating furnace maintained at a temperature above 500° C. so as to quickly and uniformly heat said deposited iron and matrix, thereby automatically separating the deposited iron layer from the matrix without producing any crack or break.

KEISABURO OTA.